Patented Feb. 16, 1932

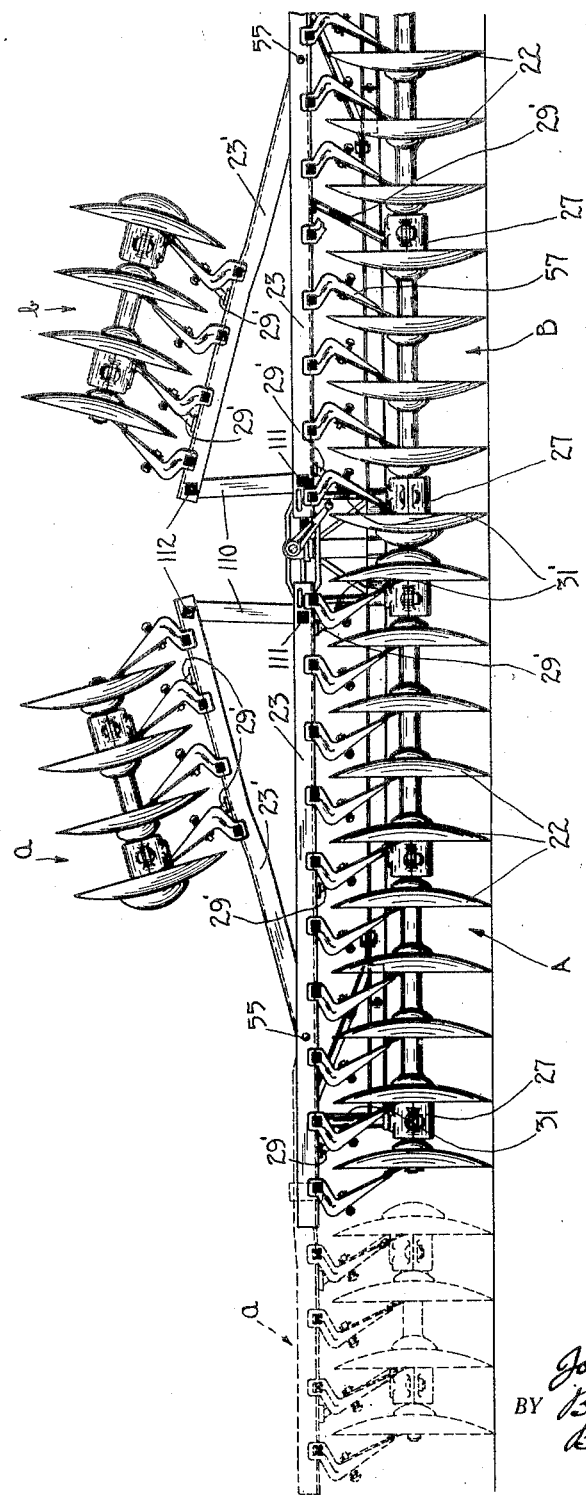

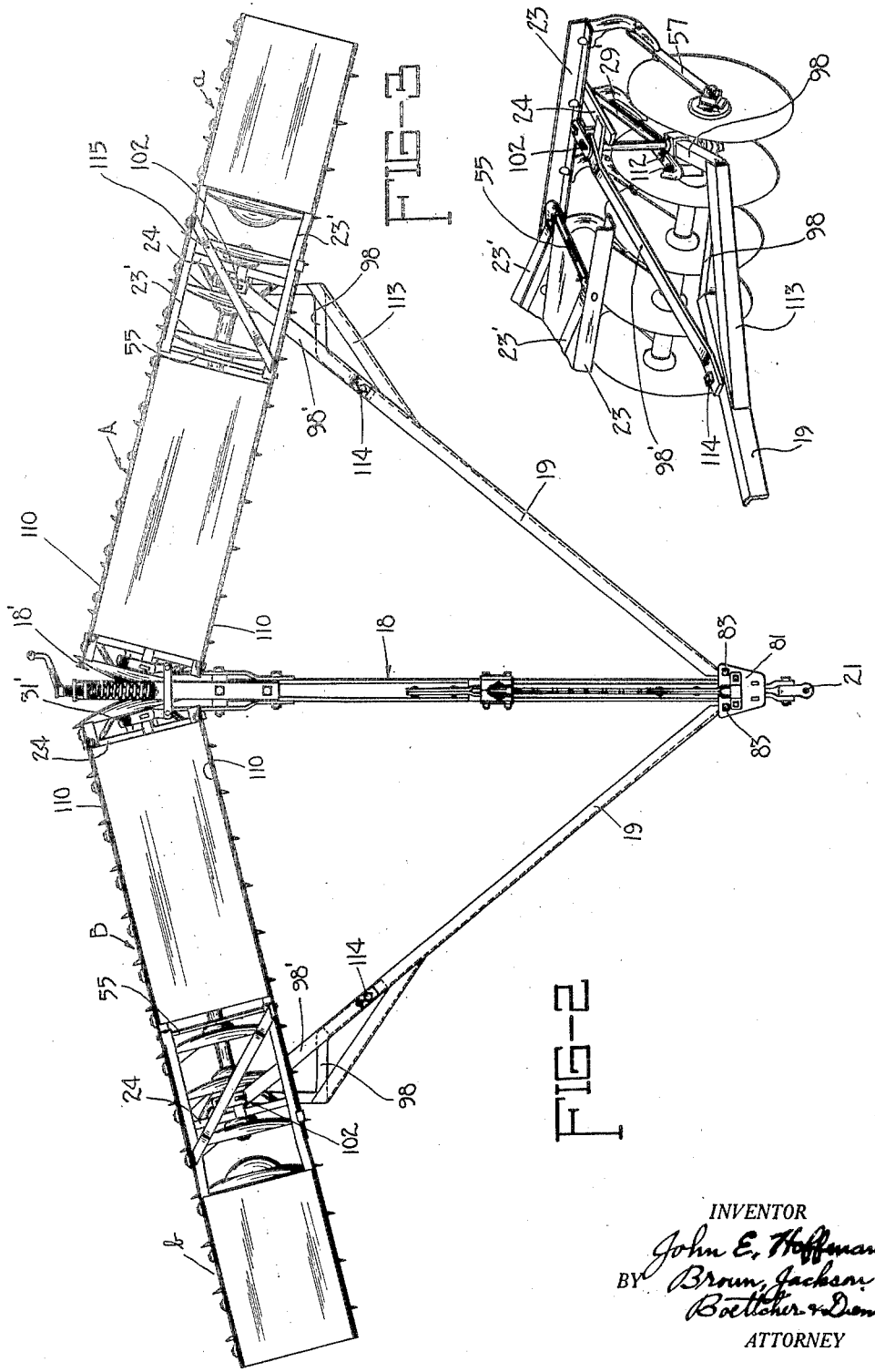

1,846,005

UNITED STATES PATENT OFFICE

JOHN E. HOFFMAN, OF MOLINE, ILLINOIS, ASSIGNOR TO DEERE & COMPANY, OF MOLINE, ILLINOIS, A CORPORATION OF ILLINOIS

DISK HARROW

Application filed March 2, 1931. Serial No. 519,309.

The present invention relates to harrows, having particular reference to disk harrows designed to be drawn by a tractor.

One of the principal objects of my invention is to provide a sectionalized harrow having oppositely extending gangs of pivotally connected sections in which the outer sections can be folded upwardly and over upon the main sections, whereby the added weight of the folded end sections is so imposed and distributed on the main sections as to cause the main sections to run at an even depth.

Another object of my invention is to provide an improved construction and arrangement of supporting means for the axle shafts of the disks which permits free and unobstructed passage of soil and the like between the disks and said supporting means.

Another object of my invention is to provide an improved construction and arrangement of diagonal draft members extending from a point of attachment adjacent to the forward end of the central draft member to a point of attachment with each gang, with said members disposed substantially in a vertical plane between said points, whereby the normal forward and downward stress of the gangs during operation will only subject said diagonal members to bending stresses and not to torsional stresses. Bending stresses in these members are not objectionable because they are resisted by the beam strength of the diagonal members, but pronounced torsional stresses often cause the harrow to vibrate or chatter and to leave the ground surface in a corrugated condition.

A further object is to provide an improved frame structure for each outer gang section reenforced so as to make said outer frames better able to transmit the draft force and to prevent rocking and warping movement.

Other objects and advantages will appear from the following detailed description of a preferred embodiment of my invention.

In the drawings illustrating such embodiment:

Figure 1 is a rear view of the harrow showing the outer gang sections folded upwardly over and upon the main sections, and illustrating, in dotted lines, one of the outer sections in operative position;

Figure 2 is a plan view of the harrow, illustrating the gangs angled to a cultivating position; and Figure 3 is a fragmentary perspective view of the end of the harrow with the outer gang section swung to inoperative position.

This invention embodies improvements over the general type of harrow disclosed in the co-pending application of Charles H. White, Serial No. 312,325, filed October 13, 1928, and reference may be made to said co-pending application for certain typical details of construction.

The main elements of the harrow comprise two main sections A and B, disposed substantially abreast of each other in oppositely extending relation, outer sections $a$ and $b$ pivoted to said main sections, central draft member 18, and two outwardly extending laterally divergent diagonal draft members 19.

The two gangs are duplicates, with the exception that the disks 22 thereof face in opposite directions. Each gang comprises main and outer sections. Each main section comprises a frame built up of two parallel angle bars 23, cross connected by transverse bars 24. Disks 22 are mounted on shafts journaled in bearings 27 under said frame. Posts 31 and 31' seat into the bearings 27 under the frames 23, and connect said bearings with cross bars 24. Standards 29', preferably of tubular round stock, connect bearings 27 with frames 23, and support said bearings thereunder. Scrapers 57 are mounted under and to the frame 23, adjacent each disk, in the customary manner, the use of said scrapers being optional. Said standards 29' are positioned in the same longitudinal plane with and forward of the scrapers, as illustrated in Figure 1.

The main sections A and B are pivoted together by connection with spring means 18' adjacent the top of posts 31' at the inner ends thereof, as described in the hereinbefore mentioned co-pending application of Charles H. White. Said posts 31', at the inner ends of sections A and B, constitute pivot axes through which the draft force from the central draft member 18 is transmitted. Similarly posts 31, adjacent the outer ends of each main section A and B, constitute vertical pivot axes for receiving draft forces transmitted from the laterally divergent diagonal draft bars 19. Bars 19 have pivotal connection with said posts 31, as will be explained.

Since the construction and operation of the central draft member 18, the connection thereof with the gangs and with the diagonal draft members 19, forms no part of this invention, they will not be specifically described herein; other than to mention that the central draft connection 18 is of the telescoping sectional type construction having adjusting mechanisms for utilizing the propelling force of the tractor for angling and straightening the gangs, such that the operator may control such angling or straightening from his position on the tractor, and that spring means 18' urges the upper ends of the posts 31' towards each other, to resist the up-thrust of the inner ends of the main sections relative to the horizontal. Reference is made to the co-pending application of Charles H. White hereinbefore mentioned.

Diagonal draft members 19 are pivoted at their front ends with draft member 18 at points 83 and have pivotal connection at their rear ends with the main sections at points 102 and extend in the vertical plane with the line of draft drawn through said points of attachment. Said diagonal members 19 have pivotal connection with vertical axes posts 31 through the offset portions 98 and extension braces 98'. Said bent or offset portions 98 of members 19 are provided in order to clear the disks and have free pivotal connection between the disks with the bottoms of posts 31. Extensions 98' extend up over the offset portions 98 in the same vertical plane between points 83 and 102 and have pivotal connection with the top of posts 31, as illustrated in Figure 3, and are secured to the main portions of members 19 by bolts at point 114 as illustrated. A brace 113 is provided to strengthen the portion 98 to the member 19, as illustrated in Figure 2, being secured thereto in any suitable manner such as welding.

Outer sections *a* and *b* are of the same general structure as the main sections A and B and are pivoted by means of pivot shafts 55 to said main sections A and B between the ends of the main sections whereby said main and outer sections are adapted for relative movement in a vertical plane. Said pivot shafts 55 extend through the angle bars 23 of the main section and 23' of the outer sections, as illustrated in Figure 3, whereby the outer sections *a* and *b* may be swung out of operative position upwardly and over upon the main sections A and B, respectively. When the outer sections are in extended operative position, as shown in dotted lines in Figure 1, angle bars 23' thereof seat in the angle bars 23 of the main sections. When so swung out of operative position, the weight of the outer sections rests near the inner ends of said main sections, Figure 1, by virtue of the outer sections being positioned over the inner halves of said main sections. Arms 110 are pivotally connected to angle bars 23 by means of bolts 111 passing through the vertical flanges of said members. When the outer sections are swung out of operative position upwardly and over upon the main sections A and B, said arms 110 are designed to support frames 23' of the outer sections by contacting under angle bars 23' thereof, and may be secured thereto by means of bolts 112 if desired, as illustrated in Figure 1.

In order to improve the construction of the outer frame sections, arched brace members 115 are welded or otherwise secured to the rear angle bar 23' at a point spaced from the pivotal connection of member 23' with pivot shaft 55 and extend diagonally across to the front angle member 23' at a point adjacent to the pivotal shaft 55, Figure 2. These members 115 are arched upwardly in order to clear the adjacent disks. In this manner, the outer frame structure is reenforced so as to make it better able to transmit the draft force and to effectively resist any tendency to rock forwardly.

It has been found that when the outer sections are pivoted to the extreme ends of the main sections and are folded upwardly and over upon the main sections, their weight is carried on the outer ends only of the main sections. This tends to cause the outer ends of the main sections to run deeper than the inner ends thereof, augmenting the natural tendency of the inner ends of the gangs to cam upwardly. In the embodiment of my invention shown, the pivot between the outer sections and the main sections has been moved inwardly sufficiently so that when the outer sections are swung upwardly and carried on the main sections, the greater portion of the weight of the former is carried on the inner ends of the main gang sections. This distribution of the added weight on the main gang section causes the gangs to run at an even depth.

Ordinarily, the standards 29' are placed in planes passing through the space between the concave side of the disk 22 and the longitudinal plane of its scraper 57. This obstructs the passage of soil through said space and forms a pocket in which soil and trash collect. In my construction, by placing the standards in the longitudinal planes of the scrapers, the above mentioned pockets are done away with and the greatest amount of opening between the disks, the standards and the scrapers is provided. In addition to placing the standards in the same longitudinal plane with the scrapers, the provision of round standards is an important feature of my invention. Round standards reduce the tendency of soil and trash collecting therearound.

In the old type of construction, the laterally divergent diagonal draft means are not in the vertical plane of a line extending between the points of connection of said diagonal draft means with the central draft means and the sections. Consequently, the normal downward pressure exerted on said diagonal draft members causes them to flex torsionally. In my construction, the draft members 19 have been positioned in the vertical plane of a line drawn through points of attachment 102 and 83 so that the normal forward and downward stress of the gangs, exerted through extension members 98' at point 114 on the diagonal draft members 19, tends to cause said diagonal members to bend downwardly only and not torsionally. Said downward stress is resisted by the beam strength of the diagonal members. This makes for a stronger construction and smoother running and prevents chattering of the harrow and leaving the ground surface in a corrugated condition.

My improved frame structure for the outer sections effectively resists the tendency of the outer section rocking forwardly and prevents warping when the outer sections are in operative position, as illustrated in Figure 2.

I wish it to be understood that, while I have described specifically a certain preferred embodiment, illustrated in the drawings, my invention is not limited to that particular construction, but includes such variations or modifications as would occur to those skilled in the art. For example, the outer sections could be flexibly secured to the main sections in any manner, permitting relative movement in a vertical plane other than as shown, so as to permit the outer sections to be folded up over and upon the inner portions of the main sections, and yet be within the scope of my invention. The claims hereinafter made are, therefore, to be construed accordingly.

I claim:—

1. In a disk harrow, the combination of two oppositely extending disk gangs, draft means connected therewith, and means for changing the angle between said gangs, each of said gangs comprising sections pivotally connected together between the ends of one section thereof for relative movement in a vertical plane.

2. In a disk harrow, the combination of two oppositely extending disk gangs, draft means connected therewith, and means for changing the angle between said gangs, each of said gangs comprising sections flexibly connected together between the ends of one section thereof for relative movement in a vertical plane.

3. In a disk harrow, the combination of two oppositely extending disk gangs, means for changing the angle between said gangs, each of said gangs comprising two sections flexibly connected together between the ends of one section for relative movement in a vertical plane, whereby one section can be swung upwardly and over upon the other section substantially over the inner end thereof.

4. In a disk harrow, the combination of two oppositely extending disk gangs, means for changing the angle between said gangs, each of said gangs comprising two sections flexibly connected together whereby the outer section can be swung upwardly and over upon the inner section, said outer sections being positioned vertically above the inner ends of said inner sections when so folded thereover.

5. In a disk harrow, the combination of two oppositely extending disk gangs, draft means connected therewith, and means for changing the angle between said gangs, each of said gangs comprising main and outer sections pivotally connected together between the ends of said main sections whereby said outer section can be swung to an inoperative position relatively to said main sections.

6. In a disk harrow, the combination of two oppositely extending disk gangs, draft means connected therewith, and means for changing the angle between said gangs, each of said gangs comprising main and outer sections pivotally connected together between the ends of said main sections and adapted for relative movement in a vertical plane whereby said outer sections can be swung out of operative position upwardly and over upon said main sections.

7. In a disk harrow, the combination of two oppositely extending disk gangs, draft means connected therewith, and means for changing the angle between said gangs, each of said gangs comprising main and outer sections flexibly connected together for relative movement in a vertical plane whereby said outer sections can be swung out of operative position upwardly and over upon said main sections, said outer sections being positioned substantially over the inner portions of said main sections when so folded, whereby the added weight of said outer sections on said main sections causes them to run at an even depth.

8. In a disk harrow, the combination of two oppositely extending disk gangs, draft means connected therewith, and means for changing the angle between said gangs, each of said gangs comprising main and outer sections pivotally connected together between the ends of said main sections for relative movement in a vertical plane whereby said outer sections can be swung out of operative position upwardly and folded over upon said main sections, one of said sections having arms adapted for supporting said outer sections when the latter are so folded.

9. In a disk harrow, the combination of two oppositely extending disk gangs, draft means connected therewith, and means for changing the angle between said gangs, each of said gangs comprising main and outer sections flexibly connected together for relative movement in a vertical plane whereby said outer sections can be swung out of operative position upwardly and folded over upon said main sections, one of said sections having arms adapted for supporting said outer sections when the latter are so folded over and upon said main sections, said outer sections being positioned substantially over the inner ends of said main sections when so folded.

10. In a disk harrow, the combination of two oppositely extending disk gangs, draft means connected therewith, and means for changing the angle between said gangs, each of said gangs comprising main and outer sections pivotally connected together between the ends of said main sections for relative movement in a vertical plane whereby said outer sections can be swung out of operative position upwardly and folded over upon said main sections, said main sections having arms pivotally connected therewith adjacent the inner ends of said main sections, said arms being adapted to be swung into engagement with said outer sections when the latter are so folded over upon said main sections for supporting said outer sections in spaced relation above said main sections, whereby the added weight of said outer sections so supported on said main sections causes the latter to run at an even depth.

11. In a disk harrow, the combination of two oppositely extending disk gangs, draft means connected therewith, and means for changing the angle between said gangs, each of said gangs comprising main and outer sections flexibly connected together for relative movement in a vertical plane whereby said outer sections can be swung out of operative position upwardly and folded over upon said main sections, said main sections having arms pivotally connected therewith adjacent the inner ends of said main sections, said arms being adapted to be swung into engagement with and under said outer sections when the latter are so folded over upon said main sections for supporting said outer sections in spaced relation above said main sections, whereby the added weight of said outer sections, when so folded on said main sections, causes the latter to run at an even depth.

12. In a disk harrow, the combination of two oppositely extending disk gangs, and draft means connected therewith, one of said gangs comprising two sections each comprising frames pivotally connected together for relative movement in a vertical plane, and a diagonal reenforcing brace extending between the front and rear edges of each outer frame for reenforcing the same against distorting stresses.

13. In a disk harrow, the combination of two oppositely extending disk gangs, draft means connected therewith, one of said gangs comprising two sections each having frames and being pivotally connected together between the ends of one section thereof for relative movement in a vertical plane, whereby one section can be swung into inoperative position upwardly and over upon the other section, said section adapted to be swung into inoperative position having a diagonal arched horizontal brace reenforcing the frame thereof.

14. In a disk harrow, the combination of a frame, disks mounted on a shaft under said frame, said shaft being journaled in bearings, standards connecting said bearings with said frame for supporting the former under the latter, draft means, and scrapers mounted on said frame and adapted to loosen dirt and the like from said disks, said standards each being positioned in substantially the longitudinal plane of the adjacent scraper.

15. In a disk harrow, the combination of a frame, disks mounted on a shaft under said frame, said shaft being journaled in bearings, tubular round standards connecting said bearings with said frame for supporting the former under the latter, draft means, and scrapers mounted on said frame and adapted to loosen dirt and the like from said disks, said standards each being positioned in substantially the longitudinal plane of the adjacent scraper.

16. In a disk harrow, the combination of a frame, disks spacedly mounted on a shaft under said frame, said shaft being journaled in bearings, standards connected with said bearings and frame for supporting said bearings to and under said frame, draft means, and inclined scrapers mounted on said frame for loosening dirt and the like from said disks, said standards being inclined at substantially the same angle as the adjacent scrapers and being disposed in front of and in substantially the same longitudinal plane with said scrapers.

17. In a disk harrow, the combination of two oppositely extending disk sections, central draft means connected therewith, means for changing the angle between said sections, and laterally divergent diagonal draft means connecting said central means with said sections between the ends thereof, said diagonal draft means being in the vertical plane of a line extending between the points of connection of said diagonal draft means with said central draft means and said sections.

18. In a disk harrow, the combination of two oppositely extending disk gangs, central draft means connected therewith, means for changing the angle between said gangs, each of said gangs comprising main and outer sections flexibly connected together for relative movement in a vertical plane, and laterally divergent diagonal draft means connecting said central draft means with said main sections, said diagonal draft means being in the vertical plane between its points of connection with said central draft means and said main sections.

19. In a disk harrow, the combination of two oppositely extending disk gangs, central draft means connected with the inner ends of said gangs, means for changing the angle between the gangs, each of said gangs comprising main and outer sections connected together between the ends of said main sections for relative movement in a vertical plane, and laterally divergent diagonal draft means pivotally connected with said central draft means and with said main sections adjacent the outer ends of the latter, said diagonal draft means being in the vertical plane between the points of connection with said central draft means and said main sections, and having offset portions adjacent the pivotal connection with said main sections for clearing the adjacent disks thereof.

20. In a disk harrow, the combination of two oppositely extending disk sections pivotally connected at their inner ends, central draft means connected therewith, and means for changing the angle between said sections, said last named means including laterally divergent diagonal draft members pivotally connected with the forward portion of said central draft means and with the outer ends of said sections, each diagonal draft means being in the vertical plane of a line extending between said points of connection with said central draft means and said sections and having an offset portion for pivotal connection with said sections between two disks thereof.

21. In a disk harrow, the combination of two sections, pivotally connected together adjacent their inner ends, central draft means, and means for changing the angle between said sections including diagonal draft members, each of said diagonal draft members having pivotal connection with the central draft means and with a vertical pivot axis on the adjacent harrow section and extending in a vertical plane between said points of connection, said diagonal draft member having an extension in the same vertical plane therewith having pivot connection with the top of said pivot axis, and having an offset portion adjacent the section for clearing the adjacent disks and having pivotal connection with said vertical pivot axis at a point below said extension and between adjacent disks.

22. In a disk harrow, a gang including inner and outer sections comprising frames connected together whereby said outer section can be swung into and out of operative position, and interlocking means on both sections cooperating with each other when the outer section is swung to operative position.

23. In a disk harrow, a gang including inner and outer sections connected together whereby said outer section can be swung into and out of operative position, said sections having vertical flanges, the flanges of one section lying outside of the flanges of the other section when the outer section is in operative position.

24. In a disk harrow, a gang including inner and outer sections connected together whereby said outer section can be swung into and out of operative position, one of said sections having parts embracing the other section when the outer section is in operative position.

25. In a disk harrow, the combination of two disk gangs, draft means connected therewith, and means for changing the angle between said gangs, each of said gangs including inner and outer sections comprising frames connected together whereby said outer sections can be swung into and out of operative position, the frames of said sections interlocking with each other when said outer section is swung to operative position.

In witness whereof, I hereunto subscribe my name this 24 day of February, 1931.

JOHN E. HOFFMAN.

CERTIFICATE OF CORRECTION.

Patent No. 1,846,005.                             Granted February 16, 1932, to

JOHN E. HOFFMAN.

It is hereby certified that error appears in the printed specification of the above numbered patent requiring correction as follows: Page 4, line 64, claim 12, before the word "frames" insert the words inner and outer; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.